(12) United States Patent
Sakamoto

(10) Patent No.: US 11,825,042 B2
(45) Date of Patent: Nov. 21, 2023

(54) PERIPHERAL DEVICE MANAGEMENT SYSTEM, PERIPHERAL DEVICE MANAGEMENT METHOD, AND PRINTING APPARATUS CONTROL SYSTEM

(71) Applicant: CANON KABUSHIKI KAISHA, Tokyo (JP)

(72) Inventor: Takahiro Sakamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/911,422

(22) Filed: Jun. 25, 2020

(65) Prior Publication Data

US 2021/0006673 A1     Jan. 7, 2021

(30) Foreign Application Priority Data

Jul. 3, 2019   (JP) ................................. 2019-124755

(51) Int. Cl.
  *G06F 15/00*   (2006.01)
  *H04N 1/00*    (2006.01)
  *H04N 1/44*    (2006.01)

(52) U.S. Cl.
  CPC ..... *H04N 1/00403* (2013.01); *H04N 1/00514* (2013.01); *H04N 1/4426* (2013.01)

(58) Field of Classification Search
  CPC ........... H04N 1/00403; H04N 1/00514; H04N 1/4426
  USPC ........................................................ 358/1.13
  See application file for complete search history.

(56) References Cited

U.S. PATENT DOCUMENTS

| 5,016,114 | A | * | 5/1991 | Sakata ................... G11B 27/28 358/404 |
| 6,975,993 | B1 | | 12/2005 | Keiller |
| 9,542,629 | B2 | * | 1/2017 | Matsuzaki ........... H04N 1/6019 |
| 10,362,183 | B2 | | 7/2019 | Kodimer |

(Continued)

FOREIGN PATENT DOCUMENTS

| CN | 109769074 A | 5/2019 |
| JP | 2001-014134 A | 1/2001 |

(Continued)

OTHER PUBLICATIONS

Japanese Office Action dated Mar. 31, 2023, in related Japanese Patent Application No. 2019-124755.

*Primary Examiner* — Mark R Milia
(74) *Attorney, Agent, or Firm* — VENABLE LLP

(57) ABSTRACT

A server system obtains instruction information based on voice data transmitted by a voice control device that receives an instruction by voice, obtains information related to a printing apparatus, performs a determination related to a function of the printing apparatus in accordance with the obtained information, and transmits an operation request based on the obtained instruction information to the printing apparatus. In a case where the instruction information corresponding to a print instruction has been obtained, a print request as the operation request is transmitted to the printer, and in a case where the instruction information corresponding to a maintenance instruction has been obtained, a maintenance request as the operation request is transmitted to the printer if the printer has a function that is able to accept the maintenance request from the server system based on the determination.

12 Claims, 9 Drawing Sheets

(56) References Cited

U.S. PATENT DOCUMENTS

| | | | |
|---|---|---|---|
| 10,437,526 | B2 | 10/2019 | Fukumoto et al. |
| 10,506,115 | B2 | 12/2019 | Kodimer |
| 10,979,581 | B2 | 4/2021 | Okamoto et al. |
| 11,252,286 | B2 | 2/2022 | Okamoto et al. |
| 11,438,469 | B2 | 9/2022 | Tsuchiya |
| 2013/0292881 | A1 | 11/2013 | Steiner et al. |
| 2013/0297320 | A1* | 11/2013 | Buser .................... B33Y 70/00 704/275 |
| 2016/0283173 | A1* | 9/2016 | Panda ................... G06F 3/1204 |
| 2019/0068810 | A1* | 2/2019 | Okamoto .............. G06F 3/1204 |
| 2019/0102116 | A1 | 4/2019 | Fukumoto et al. |
| 2022/0124208 | A1 | 4/2022 | Okamoto et al. |

FOREIGN PATENT DOCUMENTS

| | | | |
|---|---|---|---|
| JP | 2006-095984 | A | 4/2006 |
| JP | 2019-046102 | A | 3/2019 |
| JP | 2019-067258 | A | 4/2019 |
| WO | 2019123899 | A | 6/2019 |

* cited by examiner

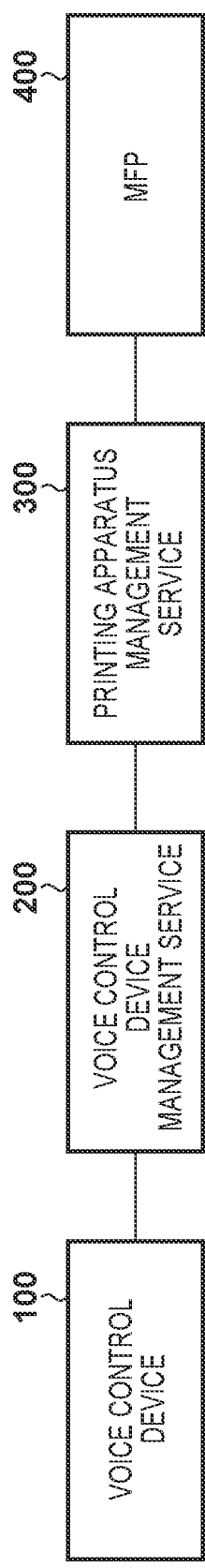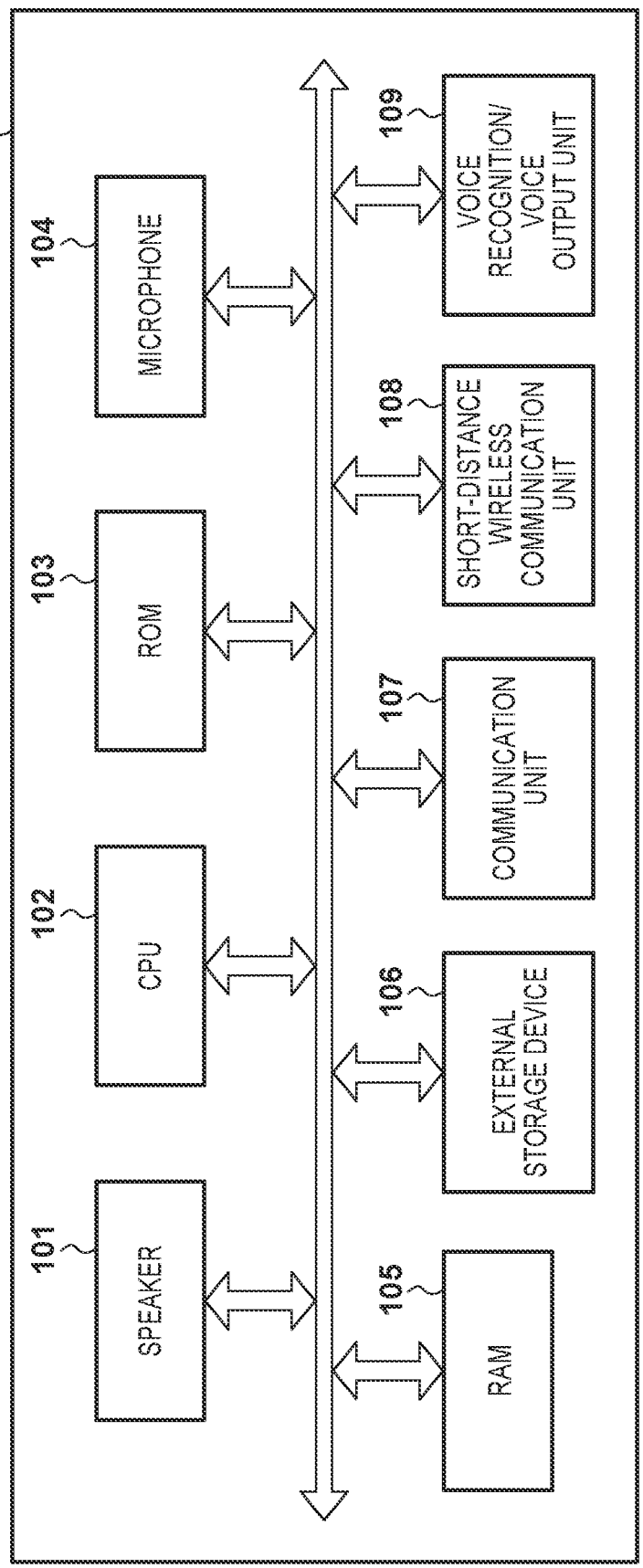

FIG. 8

| CLASSIFICATION 801 | FUNCTION 802 | ADDITIONAL SETTING ITEM 803 | SETTABLE VALUE 804 |
|---|---|---|---|
| PRINT | NUMBER PLACE | DIFFICULTY LEVEL | EASY, NORMAL, DIFFICULT |
| PRINT | FOLDED PAPER | — | — |
| COPY | COPY | — | — |
| MAINTENANCE | CLEANING | STRENGTH | NORMAL, STRONG |
| MAINTENANCE | NOZZLE CHECK PATTERN PRINTING | — | — |

PERIPHERAL DEVICE MANAGEMENT SYSTEM, PERIPHERAL DEVICE MANAGEMENT METHOD, AND PRINTING APPARATUS CONTROL SYSTEM

BACKGROUND OF THE INVENTION

Field of the Invention

The present invention relates to a peripheral device management system, a peripheral device management method, and a printing apparatus control system.

Description of the Related Art

There is known a technique of controlling a printing apparatus by giving a voice instruction to the printing apparatus directly or to an information processing apparatus connected to the printing apparatus. Japanese Patent Laid-Open No. 2006-95984 describes a technique capable of causing, by a voice instruction, a printing apparatus to perform a function that can be instructed to the printing apparatus from the UI of a printer application program.

SUMMARY OF THE INVENTION

In the technique described in Japanese Patent Laid-Open No. 2006-95984, to control the printing apparatus, a user needs to utter contents about which he/she wants to instruct the printing apparatus or an information processing apparatus connected to the printing apparatus. In this mechanism, it is difficult to give an instruction to only a specific printing apparatus in an environment in which there exists a plurality of printing apparatuses.

The present invention makes it possible to control a specific printing apparatus even in an environment in which there exist a plurality of printing apparatuses.

According to one aspect of the present invention, there is provided a peripheral device management system comprising: a management unit configured to manage a peripheral device; a control unit configured to generate, in response to an instruction accepted by a voice control device, an operation instruction to the peripheral device corresponding to the instruction by specifying the peripheral device based on an administrator account associated with the voice control device and a service account associated with the peripheral device; and a unit configured to transmit the generated operation instruction to the specified peripheral device, wherein if the voice control device accepts an instruction concerning maintenance, the control unit generates an operation instruction of the maintenance to the peripheral device.

According to the second aspect of the present invention, there is provided a printing apparatus control system comprising a printing apparatus management server system configured to generate an operation instruction based on a voice instruction accepted by a voice control device, and a printing apparatus configured to operate based on the operation instruction generated by the printing apparatus management server system, the printing apparatus management server system including a determination unit configured to determine, based on a setting item associated with a type of an operation as a target of the voice instruction transmitted by the voice control device, whether it is possible to execute an operation in the printing apparatus in accordance with setting contents included in the voice instruction, a transmission unit configured to transmit, if the determination unit determines that it is impossible to execute the instructed operation, to the voice control device, message data for inquiring about setting contents of a setting item for making it possible to execute the operation, and a generation unit configured to generate, if the determination unit determines that it is possible to execute the instructed operation, an operation instruction for executing the operation by acquiring setting contents of a setting item other than the setting item associated with the type of the operation.

According to the present invention, even if there exist a plurality of printing apparatuses, it is possible to control a specific printing apparatus among the plurality of printing apparatuses by a voice instruction.

Further features of the present invention will become apparent from the following description of exemplary embodiments with reference to the attached drawings.

BRIEF DESCRIPTION OF THE DRAWINGS

FIG. 1 is a block diagram showing the arrangement of a printing apparatus control system;

FIG. 2 is a block diagram showing the arrangement of a voice control device;

FIG. 8 is a table showing a table of summarizing functions which can be instructed to a printing apparatus and setting items;

DESCRIPTION OF THE EMBODIMENTS

Figure 3:
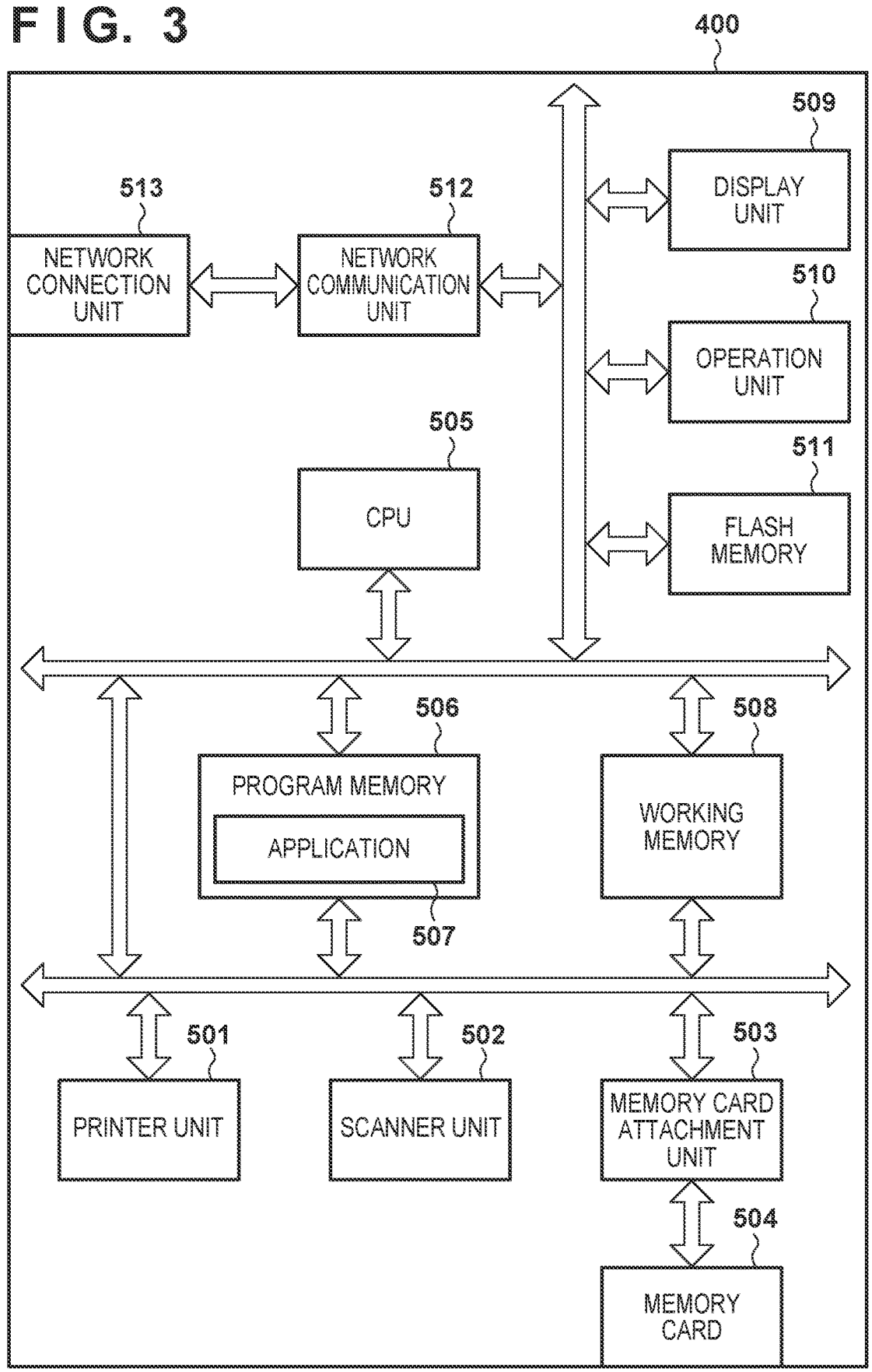
FIG. 3 is a block diagram showing the arrangement of a voice control device management service and a printing apparatus management service.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

System Arrangement

FIG. 1 is a block diagram showing an example of the arrangement of a printing apparatus control system according to this embodiment. The printing apparatus control system shown in FIG. 1 is a system in which a voice control device 100, a voice control device management service 200, a printing apparatus management service 300, and an MFP 400 are communicably connected via a network such as the Internet. The voice control device 100 can transmit, via the network, voice data corresponding to a voice uttered by the user, and can output, by a voice, voice data received via the network. The voice control device 100 may be a computing device, such as a smartphone, a computer, a tablet terminal, or a so-called smart speaker, that has a voice input/output function and a communication function and can be connected to the voice control device management service 200 at an application level. The voice control device management service 200 is formed by a server or a server group that manages the voice control device 100. The voice control device management service 200 performs predetermined processing (to be described later) in accordance with, for example, contents of the voice data received from the voice control device 100. Note that the MFP 400 is an example of a management target peripheral device. The present invention is not limited to a printing apparatus such as an MFP, and may be applied to other peripheral devices. In this example, however, the MFP having a printing function will be exemplified.

The voice control device management service 200 may be provided by, for example, a cloud server. In this case, a voice control service provided by the voice control device management service 200 can change in accordance with a cloud service used. For example, voice data may be input from the voice control device 100, and the voice control device management service 200 may perform voice recognition. Conversely, the voice control device management service 200 may combine voice data from text data, and output the thus obtained data to the voice control device 100 to reproduce it. Alternatively, the voice control device 100 may perform voice recognition and voice combining, and text data may be input/output. This example assumes the former arrangement. The function of the voice control device management service 200 may be executed not by one server but by a plurality of servers in cooperation with each other. Note that the voice control device management service 200 manages the voice control device 100, and performs, for example, processing of specifying an administrator account by authenticating the user based on the voice data output from the voice control device. Furthermore, the voice control device management service 200 specifies the service account of a print service linked with the administrator account.

The printing apparatus management service 300 controls the MFP 400, and is formed by, for example, a server or a server group that generates operation instruction data (or an operation instruction) in response to a request from the voice control device management service 200 and transmits it to the MFP 400. The printing apparatus management service 300 manages the user and an image forming apparatus such as an MFP in association with each other by, for example, a management table or the like. That is, the printing apparatus management service 300 saves the service account of the print service and information (for example, identification information such as a model name or an apparatus name) concerning the image forming apparatus such as the MFP 400 in association with each other. Note that a plurality of MFPs may be connected to the printing apparatus management service 300. Furthermore, the function of the printing apparatus management service 300 may be executed not by one server but by a plurality of servers in cooperation with each other.

Figure 9:
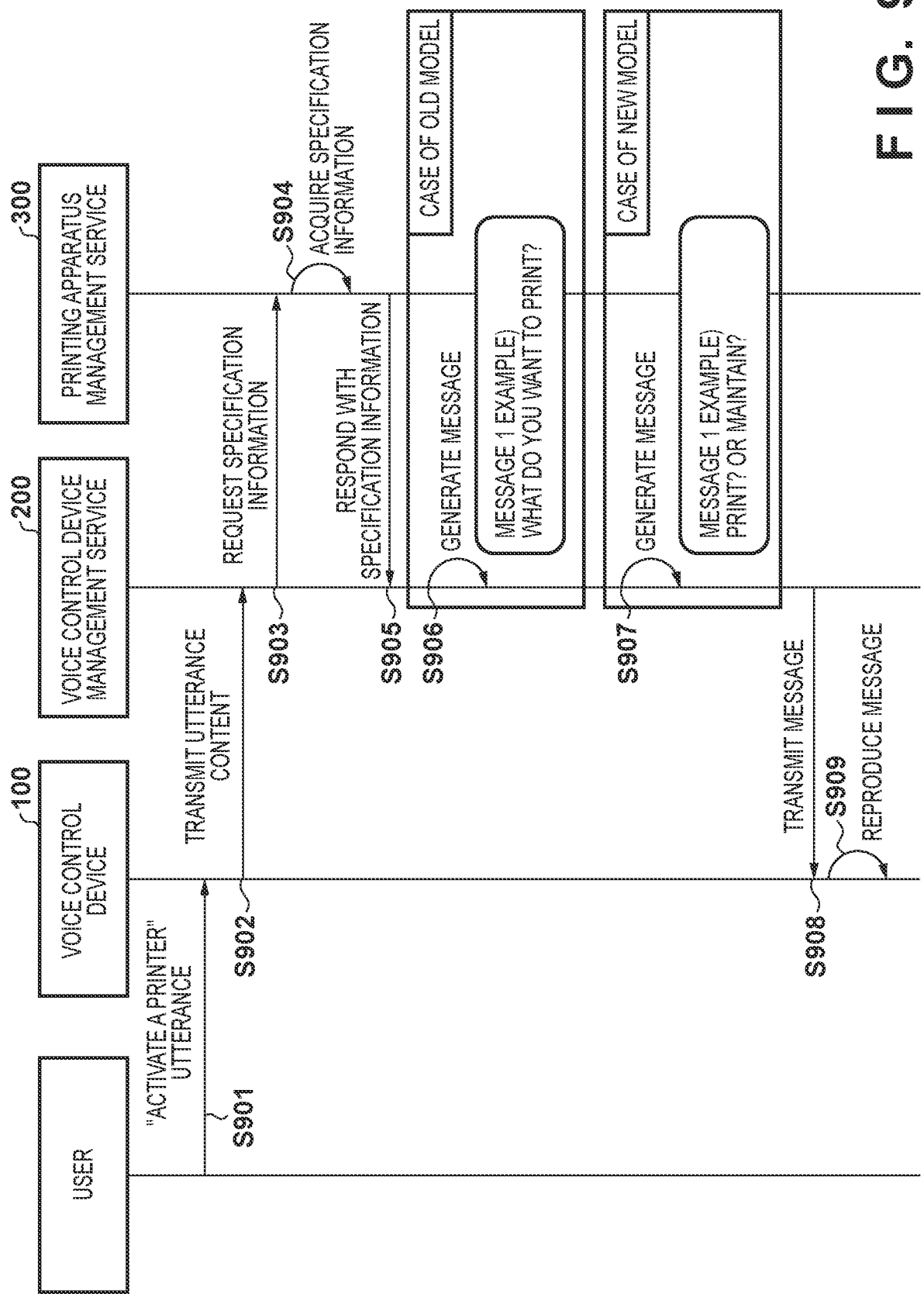
FIG. 9 is a sequence chart showing processing of the printing apparatus control system in accordance with the specifications of the printing apparatus.

Since the printing apparatus management service 300 is implemented by being installed on a server, the server may be referred to as a printing apparatus management server hereinafter. Although some functions of the voice control device management service 200 may be provided by, for example, an application providing service by a cloud server or the like, an interface with the printing apparatus management service 300 may be provided by the provider of the printing apparatus management service 300. The interface with the printing apparatus management service 300 corresponds to, for example, a procedure, shown in FIGS. 6, 7, and 9, between the voice control device management service 200 and the printing apparatus management service 300. In this case, the printing apparatus management service 300 and the interface between the voice control device management service 200 and the printing apparatus management service 300 may collectively be referred to as a printing apparatus management system or a peripheral device management system hereinafter.

Hardware Arrangement of Voice Control Device

FIG. 2 is a block diagram showing the hardware arrangement of the voice control device 100. The voice control device 100 includes a loudspeaker 101, a CPU 102, a ROM 103, a microphone 104, a RAM 105, an external storage device 106, a communication unit 107, and a short-distance wireless communication unit 108. Note that respective blocks shown in FIG. 2 are interconnected using, for example, an internal bus. Note also that CPU is an acronym for Central Processing Unit, ROM is an acronym for Read Only Memory, and RAM is an acronym for Random Access Memory. In this embodiment, the operation of the voice control device 100 is implemented when, for example, the CPU 102 loads a program stored in the ROM 103 into the RAM 105, and executes it.

The loudspeaker 101 outputs a voice based on voice data. The CPU 102 is provided on, for example, a system control board, and comprehensively controls the voice control device 100. The ROM 103 stores fixed data such as control programs to be executed by the CPU 102, data tables, and an embedded OS (Operating System) program. In this embodiment, each control program stored in the ROM 103 is a target of software execution control of the embedded OS stored in the ROM 103. Software execution control is, for example, scheduling, task switch, or interrupt processing. The microphone 104 receives a voice on the periphery of the voice control device 100, for example, a voice uttered by the user. The received voice is converted into digital voice data by, for example, a program executed by the CPU 102.

The RAM 105 is formed by, for example, an SRAM (Static RAM) or the like that needs a backup power supply. Note that the RAM 105 holds data by a primary battery (not shown) for data backup and can therefore hold data such as a program control variable without volatilizing it. In addition, a memory area to store the setting information and management data of the voice control device 100 is also provided in the RAM 105. The RAM 105 is also used as the main memory and the work memory of the CPU 102. The external storage device 106 stores application software.

The communication unit 107 includes a circuit and an antenna for performing communication in accordance with a predetermined wireless communication method. For example, the communication unit 107 can wirelessly be connected to an external access point. In addition, the communication unit 107 can temporarily operate as an access point. The wireless communication used in this embodiment may have a capability to operate in accordance with the wireless communication method of a wireless LAN complying with the IEEE802.11 standard series or may have a capability to operate in accordance with another wireless communication method. The short-distance wireless communication unit 108 executes short-distance wireless communication with another apparatus existing within a predetermined short-distance range from the voice control device 100. Note that the short-distance wireless communication unit 108 performs communication using a wireless communication method different from that of the communication unit 107. In this embodiment, the short-distance wireless communication unit 108 operates in accordance with the Bluetooth® standard. A communication partner includes, for example, the voice control device management service 200 connected via the network such as the Internet.

A voice recognition/voice output unit 109 recognizes a voice input via the microphone 104 to generate voice data, and also converts voice data received from the outside, for example, from the voice control device management service 200 or message data held in advance into a voice signal to output a voice from the loudspeaker 101.

General Hardware Arrangement of Server

Figure 4:
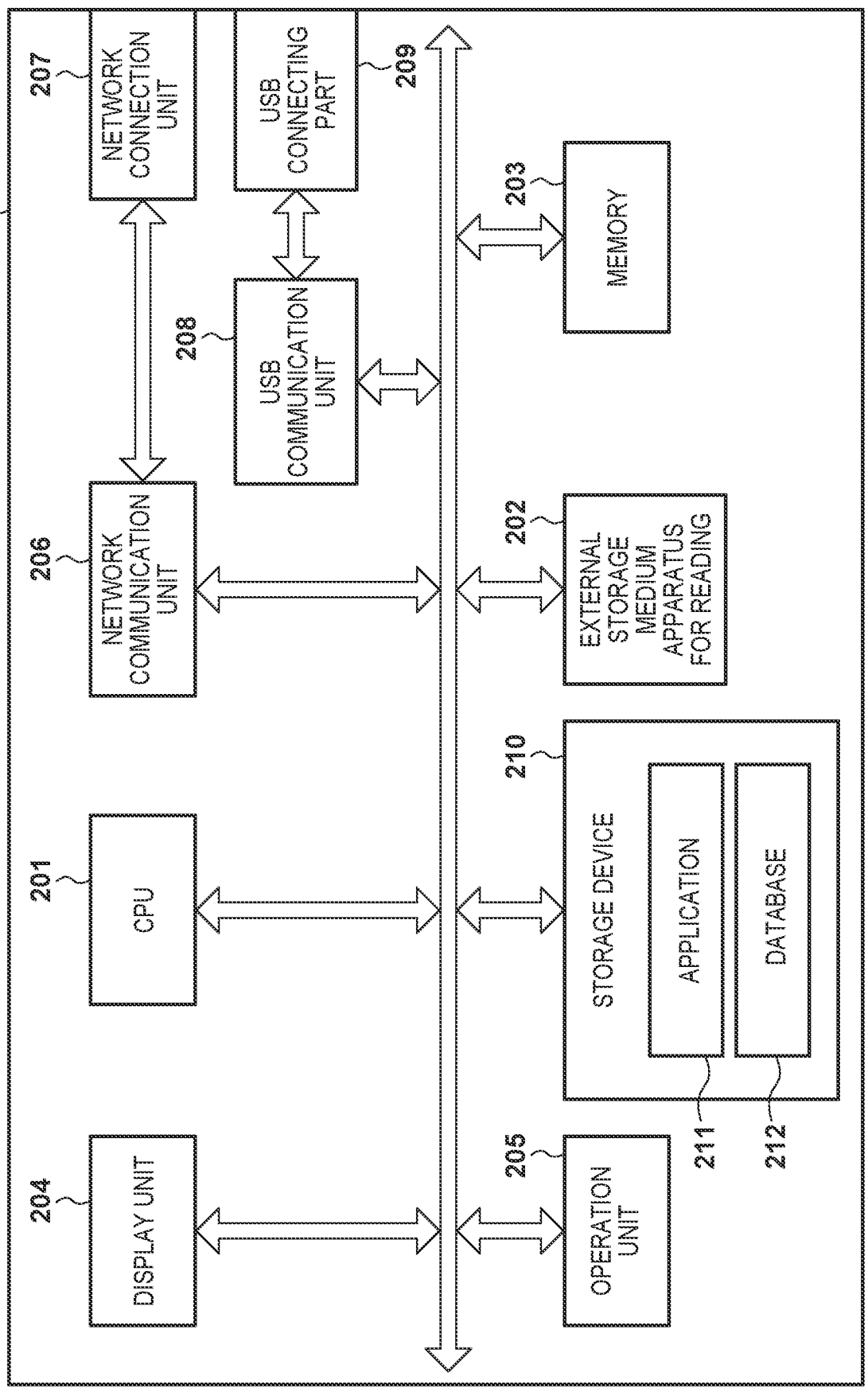
FIG. 4 is a block diagram showing the arrangement of an MFP.

FIG. 4 is a block diagram showing the schematic arrangement of a server in which the voice control device management service 200 and the printing apparatus management service 300 can operate.

A CPU 201 is a central processing unit for controlling respective units to be described below. A storage device 210 stores an application program 211 read out by the CPU 201, a database 212, and an OS, as well as various files. An external storage medium reading device 202 is a device for reading information such as a file stored in an external storage medium such as an SD card. A memory 203 is formed by a RAM or the like, and the CPU 201 temporarily stores or buffers data in the memory 203, as needed. A display unit 204 is formed by, for example, an LCD, and displays various kinds of information. An operation unit 205 is formed by a keyboard, a mouse, and the like used by the user to perform various input operations. A network communication unit 206 is connected to a network such as the Internet via a network connection unit 207 to perform various communications. The network communication unit 206 supports a wired LAN or a wireless LAN. For the wired LAN, the network connection unit 207 is a connector for connecting a wired LAN cable. For the wireless LAN, the network connection unit 207 is an antenna. Note that in this embodiment, if an image processing apparatus performs wireless communication by the wireless LAN, wireless communication complying with the IEEE802.11 standard series is performed. The network connection unit 207 may support both the wired LAN and the wireless LAN. A USB communication unit 208 is connected to various peripheral devices via a USB connection unit 209 to perform various communications.

Furthermore, the operation of the voice control device management service 200 (or the printing apparatus management service 300) according to this embodiment is implemented when, for example, a CPU 301 loads a program necessary for processing from a disk device 302 into a memory 304 and executes the program. The voice recognition function of the voice recognition/voice output unit 109 shown in FIG. 2 may be included in the arrangement of FIG. 3. In this case, the apparatus including the arrangement of FIG. 3 can, for example, recognize a voice signal transmitted from the voice control device 100, recognize a predetermined word, and extract it. Although this embodiment describes the voice control device management service 200 and the printing apparatus management service 300 as separate apparatuses (information processing apparatuses), these services may be formed by a print control apparatus that integrates both the server functions. Alternatively, each of the voice control device management service 200 and the printing apparatus management service 300 may be formed by a plurality of servers. The display unit 204 and the operation unit 205 are not essential for performing the functions of this embodiment.

Arrangement of Image Processing Apparatus

FIG. 3 is a block diagram showing the schematic arrangement of the MFP 400 as an image processing apparatus. Note that this specification will exemplify an MFP (Multi-Function Printer) that executes a printing function, a maintenance function, and the like as a peripheral device. However, an image processing apparatus, a copy machine, a facsimile, a printing apparatus having a single function, or the like may be used. Note that the MFP 400 serves as an image forming apparatus that forms an image on a print medium by a predetermined printing method and, for example, an inkjet printing method or an electrophotographic method is adopted as the printing method.

In the MFP 400, the printing function is implemented by a printer unit 501, a scanner function is implemented by a scanner unit 502, and a storage function is implemented by a memory card attachment unit 503 and a memory card 504.

The printer unit 501 prints externally received image data, image data stored in the memory card 504, or the like on a print sheet by a printing method such as an inkjet method or an electrophotographic method. In addition, the printer unit 501 manages ink information including the remaining amount of ink and sheet information including the number of stacked sheets. For, the inkjet method, for example, the printer unit 501 may have a cleaning function for recovering an ink discharge capability or a mechanism for function recovery.

The scanner unit 502 optically reads an original set on an original table (not shown), converts it into electronic data, and transmits image data converted into a designated file format to an external apparatus via a network or stores the image data in a storage area (not shown) such as an HDD. A copy service is implemented when image data generated by reading, by the scanner unit 502, an original placed on the original table is transferred to the printer unit 501, and the printer unit 501 prints the image data on a print sheet.

The memory card 504 attached to the memory card attachment unit 503 stores various file data. The file data may be read out from an external apparatus via the network and edited. Furthermore, the file data can be stored from an external apparatus in the memory card 504.

In addition, the MFP 400 includes a CPU 505, a program memory 506, a working memory 508, a display unit 509, an operation unit 510, a network communication unit 512, a network connection unit 513, and a flash memory 511. The CPU 505 is a central processing unit for controlling the respective units in the MFP 400. The program memory 506 is formed by a ROM or the like, and stores various program codes and an application 507 for communicating with a server apparatus. The application 507 accesses the printer unit 501 to acquire consumable supplies information concerning ink, a sheet, and the like. The working memory 508 is formed by a RAM or the like, and temporarily stores or buffers image data and the like at the time of execution of each service. The display unit 509 is formed by, for example, an LCD, and displays various kinds of information. The operation unit 510 is formed by a switch and the like used by the user to perform various input operations.

The network communication unit 512 connects the MFP 400 to the network to perform various communications. The MFP 400 can be connected to the network such as the Internet via the network connection unit 513. A server that provides the printing apparatus management service 300 is also connected to the network. The network communication unit 512 supports the wired LAN or the wireless LAN. For the wired LAN, the network connection unit 513 is a connector for connecting a wired LAN cable. For the wireless LAN, the network connection unit 513 is an antenna. Note that in this embodiment, if the image processing apparatus performs wireless communication by the wireless LAN, wireless communication complying with the IEEE802.11 standard series is performed. The network communication unit 512 may exclusively or simultaneously perform wired communication by the wired LAN and wireless communication by the wireless LAN. Note that the network connection unit 513 may support both the wired LAN and the wireless LAN. The flash memory 511 is a nonvolatile memory for storing image data received by the network communication unit 512 and the like. The processing (to be described later) of the MFP 400 is implemented when the CPU 505 reads out a program necessary for the processing and executes the program. Although not shown, the image processing apparatus may also perform short-distance wireless communication in accordance with the Bluetooth® standard. This short-distance wireless communication and the above-described wireless communication by the wireless LAN may be implemented by different chips or the same chip.

Note that the arrangements shown in FIGS. 2, 3, and 4 are merely examples, and each apparatus may include a hardware component except for those shown in FIG. 2, 3, or 4. In each of FIGS. 2, 3, and 4, a plurality of blocks may be integrated into one block, and one block may be divided into two or more blocks. That is, each of the apparatuses shown in FIGS. 2, 3, and 4 may have another arrangement as long as it is possible to execute processing (to be described later) according to this embodiment.

Creation of Printing Apparatus Control System

Figure 5:
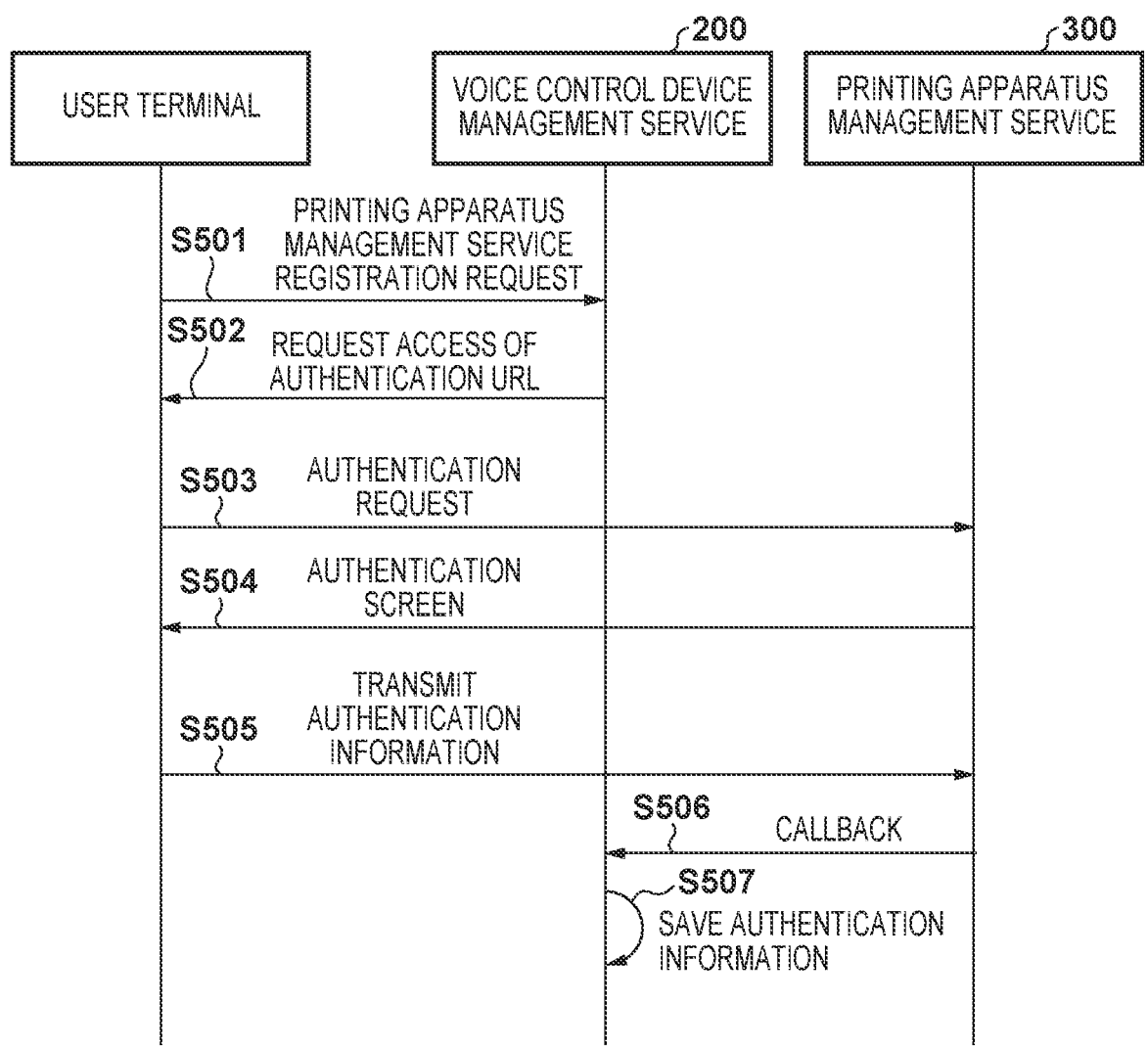
FIG. 5 is a sequence chart showing processing of associating the voice control device and the MFP with each other.

Processing of associating the voice control device 100 and the MFP 400 with each other in order for the user to use the service (the operation of this embodiment) of the printing apparatus control system will be described next. This association processing is user registration processing necessary for the user to use the service (the operation of this embodiment) of the printing apparatus control system by a voice instruction. This association processing associates, with the voice control device 100, the MFP 400 that executes printing in response to a voice of the user accepted by the voice control device 100. FIG. 5 is a sequence chart showing the processing of associating the voice control device 100 and the MFP 400 with each other. Processing executed by each apparatus in this sequence is implemented when the CPU of each apparatus executes a program stored in the ROM or the like of each apparatus. The program executed by a user terminal is a voice control application. Note that before this procedure, the printing apparatus management service 300 is registered in the voice control device management service 200. For example, the URL of the authentication screen of the printing apparatus management service 300 has been registered in the voice control device management service 200, and the transmission destination of authentication information for the printing apparatus management service 300 when performing authentication on the authentication screen has been registered in the printing apparatus management service 300. More specifically, using the voice control application of the user terminal such as a personal computer or a mobile terminal such as a smartphone, the user logs in, in advance, to an administrator account (a user account for the voice control device 100) which is issued and managed by the voice control device management service 200. This allows the voice control device management service 200 to recognize information concerning the voice control application of the user terminal associated with the administrator account. Furthermore, the user terminal recognizes information (user ID and password) concerning the administrator account. Note that the user terminal is basically formed by an arrangement obtained by adding a display unit such as a touch panel to the hardware arrangement shown in FIG. 2.

Before the start of the sequence shown in FIG. 5, the voice control device 100 and the administrator account are associated with each other. More specifically, upon acquiring the information concerning the administrator account from the user terminal via a local area network, the voice control device 100 transmits the identification information of itself and the information concerning the administrator account to the voice control device management service 200. Thus, the voice control device management service 200 manages the voice control device 100 and the administrator account in association with each other. Note that if a display unit is provided in the voice control device 100, the user may use the display unit to log in to the administrator account, thereby associating the voice control device 100 and the administrator account.

Furthermore, before the start of the sequence shown in FIG. 5, voice data of the user and the administrator account are preferably associated with each other. More specifically, the voice control device 100 transmits, to the voice control device management service 200, voice data based on a voice accepted from the user. Then, the voice control device management service 200 manages the voice data of the user and the administrator account in association with each other. This embodiment assumes that a plurality of administrator accounts can be registered in association with one voice control device 100. Note that if a microphone and a loudspeaker are provided in the user terminal, the user terminal may transmit, to the voice control device management service 200, voice data based on a voice accepted by the user terminal. More specifically, acceptance of a voice and the administrator account are preferably linked with each other by issuing, by the user, an instruction using the voice control application in the user terminal. In this case as well, the voice control device management service 200 can manage the accepted voice data and the administrator account in association with each other.

In addition, before the start of the sequence shown in FIG. 5, the user acquires the service account managed by the printing apparatus management service 300. The service account managed by the printing apparatus management service 300 is a user account necessary to use the print service provided by the printing apparatus management service 300.

Although it is possible to register one or a plurality of management target image processing apparatuses in the printing apparatus management service 300, the registration processing may or may not have been performed at the time of execution of the procedure shown in FIG. 5.

In the sequence shown in FIG. 5, the user transmits a registration request of the printing apparatus management service 300 to the voice control device management service 200 using the user terminal associated in advance with the voice control device 100 (S501). For example, the registration request in S501 may be executed on a local application installed on the user terminal or executed from a Web page via a Web browser. Note that the voice control device 100 and the user terminal may be associated with each other using the user information (administrator account) of the voice control device management service 200 or the like, as described above. Therefore, if the voice control device 100 has a necessary input/output capability, the voice control device 100 may be used as the user terminal.

Upon receiving the registration request of the printing apparatus management service 300, the voice control device management service 200 requests the user terminal to access an authentication URL, registered in advance, where the printing apparatus management service 300 authenticates the user (performs user authentication) (S502). Upon receiving the request, the user terminal transmits an authentication request to the printing apparatus management service 300 based on the received authentication URL (S503), and the printing apparatus management service 300 transmits authentication screen data to the user terminal (S504). Upon acquiring the authentication screen data, the user terminal displays an authentication screen based on the authentication screen data. Then, the user uses the displayed authentication screen to input authentication information necessary to use the service of the printing apparatus management service 300 registered in advance. The necessary authentication information includes, for example, the user ID and password of the service account registered for the user to log in to the printing apparatus management service 300.

If the authentication information necessary to use the service of the printing apparatus management service 300 is input from the user on the user terminal, the user terminal transmits the input authentication information to the printing apparatus management service 300 (S505). The printing apparatus management service 300 executes authentication processing based on the authentication information transmitted from the user terminal. If this authentication processing is successfully complete, the printing apparatus management service 300 transmits a callback to the voice control device management service 200 (S506). The destination of the callback is registered in advance in the printing apparatus management service 300, and the callback includes an access token generated based on the authentication information authenticated by the printing apparatus management service 300.

The voice control device management service 200 acquires, by the callback, the access token for accessing the printing apparatus management service 300. The voice control device management service 200 saves, together with the information of the voice control device 100 associated with the user terminal, the information, acquired in S506, of a refresh token or an access token necessary to access the printing apparatus management service 300 (S507).

The voice control device management service 200 can access the printing apparatus management service 300 using the acquired access token. Then, the printing apparatus management service 300 can specify the login user (corresponding service account) based on the access token, thereby specifying the MFP 400 registered by the user. Note that in this embodiment, the active period of the access token or the refresh token is an indefinite period (or an active period that can be considered as an indefinite period in actual use). In S507, the access token may be saved in association with the user information (administrator account) used when the user terminal logs in to the voice control device management service 200. That is, for a given user, the user information (administrator account) of the voice control device management service 200 and the access token (that is, the user information (service account) of the printing apparatus management service 300) saved in S507) are linked with each other. This allows the user of the voice control device 100 to log in to the printing apparatus management service 300 and to use the MFP, that is, the image forming apparatus that is under the management of the printing apparatus management service 300 and is associated with the user.

In the above description, the user authentication operation has been exemplified as a method of associating the voice control device 100 and the MFP 400 with each other. However, another method may be used as long as it is possible to associate the voice control device 100 and the MFP 400 with each other.

Use of MFP by User

A procedure from when the user issues a voice instruction until the MFP 400 associated with the voice control device 100 executes an instructed operation will be described below with reference to FIGS. 6 and 7. Assume that the user of the voice control device 100 has logged in to the voice control device management service 200. In this state, the voice control device 100 can accept a voice instruction. To accept the voice instruction, the login state may normally be maintained. Processing executed by each apparatus in this sequence is implemented when the CPU of each apparatus executes a program stored in the ROM or the like of each apparatus.

The user utters "Activate a printer" to the microphone 104 of the voice control device 100 in order to call the function of the MFP 400 (S601). Utterance contents are registered in advance in the voice control device management service 200 as a keyword (activation phrase) to call the function of the MFP 400.

The voice control device 100 transmits the utterance contents received in S601 to the voice control device management service 200 (S602). Note that voice data of the utterance contents of the user may be transmitted intact, or the voice data may be converted into text data in the voice control device 100 and then transmitted. Then, the voice control device management service 200 confirms the MFP 400 managed by the printing apparatus management service 300 to generate utterance contents based on the received keyword of "Activate a printer".

To do this, the voice control device management service 200 issues, to the printing apparatus management service 300, a request to request printer information (S603). Prior to the request, the voice control device management service 200 logs in to the printing apparatus management service 300 using the access token saved in association with the user information of the user who has transmitted the utterance contents in S602. Note that the access token may be transmitted for each request. If the voice control device management service 200 logs in to the printing apparatus management service 300 once in the procedure shown in FIG. 5, the login state may be maintained until a logout operation. In this case, it is unnecessary to perform a login operation for each request. Upon receiving the request, the printing apparatus management service 300 acquires information of the MFP 400 linked with the account of the user as the transmission source of the request (S604). The printing apparatus management service 300 returns, as a response, the printer information of the MFP 400 to the voice control device management service 200 (S605). Upon acquiring the information of the MFP, the voice control device management service 200 generates message data (to be simply referred to as a message 1 hereinafter) for outputting a voice from the loudspeaker 101 of the voice control device 100 (S606 and S607). The message 1 is a message for inquiring about an operation that can be instructed by the user. If the MFP 400 corresponding to the printing apparatus management service 300 is not registered, even if the user instructs any operation next, it is impossible to instruct any operation to the MFP 400, and thus, for example, a message of "No printer is registered. You have to register a printer to use" is generated (S606). On the other hand, if the MFP 400 corresponding to the printing apparatus management service 300 is registered, the user can normally use the system, and thus, for example, a message of "What do you want to print?" is generated (S607). The voice control device management service 200 transmits the generated message 1 to the voice control device 100 (S608), and the voice control device 100 reproduces the received message 1 to the user by outputting the message 1 by voice from the loudspeaker 101 (S609)

The printing apparatus management service 300 generates the message 1 in accordance with whether the MFP 400 is registered in the printing apparatus management service 300. However, the generated message may be switched in consideration of the past registration status. For example, if the MFP 400 was registered in the printing apparatus management service 300 yesterday but no MFP 400 is registered today, the possibility that the user attempts to switch the registered printer and keeps failing in switching is considered. In this case, an announcement can be made in accordance with the environment of the user by generating, for example, a message of "No printer is found. You have to register a printer to use the system." If two or more MFPs 400 are connected to the printing apparatus management service 300, the user may decide a priority order in advance and issue an operation instruction to the MFP 400 having the highest priority level, or the user may be inquired about the MFP 400 to which an operation instruction is issued every time the user issues the operation instruction.

Subsequently, the user listens to the message 1 reproduced in S609, and instructs, by voice, an operation to be executed in the MFP 400. The following description will be provided with reference to FIG. 7. In S701 of FIG. 7, the user utters, for example, "Maintain". The voice control device 100 transmits utterance contents received in S701 to the voice control device management service 200 (S702). A transmission method at this time may be voice data or text data, similar to S602. With respect to the correspondence between the utterance contents and an operation indicated by them, for example, a predetermined keyword may be extracted by analyzing text corresponding to the utterance contents and an operation may then be decided in accordance with the keyword, or an operation may be decided by performing in advance machine learning of the correspondence between text and an operation and using the learned correspondence. These are merely examples, as a matter of course. The designated operation is stored in the memory or the like as an operation to be performed.

The voice control device management service 200 determines whether an additional setting is made for the type of the instructed operation (S703). This determination processing is performed by holding an operation-setting table shown in FIG. 8 in the storage device 210 of the voice control device management service 200 and confirming the presence/absence of an additional setting item for the instructed operation.

Operation-Setting Table (FIG. 8)

FIG. 8 shows an example of the table held by the voice control device management service 200. The table shown in FIG. 8 is held in, for example, the storage device 210. As an item 801 of the table, the classifications of functions that can be instructed to the printer are listed. Referring to FIG. 8, as a list of instructions to the printer, a "printing" function, a "copy" function, and a "maintenance" function are listed. As an item 802, concrete functions belonging to each instruction classification are associated. In addition, depending on the function, an additional setting item 803 can be designated. For example, in FIG. 8, "difficulty level" is associated with "number place", and "strength" is associated with "cleaning". Furthermore, as an item 804, candidates of a settable value are associated as setting contents for each additional setting item 803. For example, in FIG. 8, "easy, normal, hard" are associated with the "difficulty level". In addition, "-" indicates an item in which no additional setting contents exist.

As described above, the operation-setting table includes, in correspondence with the classification 801 of the instructed operation, the function 802 for each operation, the necessary additional setting item 803 for each function, and the settable values 804 (that is, options) of the setting item, and these items may have a hierarchical relationship. The presence/absence of the additional setting item, that is, the presence/absence of the setting item other than the setting item associated with the classification of the operation instruction is determined with reference to the classification 801 of the instructed operation (or instruction). The additional setting includes specification of the function and specification of the setting item. Note that in the operation-setting table, a text message for inquiring the user about the function and setting value may be registered in each field. For example, if the classification of the operation is "maintenance", "cleaning" or "nozzle check pattern printing" can be selected as the function. A text message for inquiring the user about which of the functions is to be selected may be registered in association with "maintenance" of the operation classification.

If, as a result of the determination processing in S703, it is determined that there is the additional setting item, message data (to be also simply referred to as a message 2 hereinafter) of the message 2 representing contents output to the user by voice by the voice control device 100 is generated (S704). Contents of the message 2 are contents presenting an operation that can be instructed next by the user. If, for example, "maintenance" is designated as the operation, there are "cleaning" and "nozzle check pattern printing" as the selectable functions in FIG. 8. In this case, as the contents of the message 2, message data of "Which of 'cleaning' and 'nozzle check' will you select?" is generated.

The voice control device management service 200 transmits the generated message 2 to the voice control device 100 (S705), and the voice control device 100 reproduces the received message 2 to the user by outputting the message 2 by voice by the loudspeaker 101 (S706).

Subsequently, the user selects one of the settable values for the additional setting item presented by the message 2 reproduced in S706, and utters the additional setting (S707). For the message 2 concerning the above-described cleaning strength, for example, "Strong" is uttered. The voice control device 100 transmits received utterance contents to the voice control device management service 200 (S708). A transmission method at this time may be voice data or text data, similar to S602. The received additional setting is stored in association with the operation received and stored in S702.

Upon receiving the request, the voice control device management service 200 confirms whether all the pieces of setting information for cleaning have been set (S709). If it is determined that not all the pieces of setting information have been set, for example, if it is determined, with reference to the operation-setting table shown in FIG. 8, that there is a further necessary setting item, S704 to S709 are repeated for setting the item. If, for example, "cleaning" is selected as the function of the maintenance operation, it is determined that there is "strength" as the additional setting item. Then, message data (to be also simply referred to as the message 2 hereinafter) of the message 2 representing contents to be output to the user by voice by the voice control device 100 is generated (S704). The contents of the message 2 are contents presenting an operation that can be instructed next by the user. For example, if "cleaning" is designated as the operation, there is "strength" as the addition setting item in FIG. 8, and there are two kinds of settable values of "normal, strong". In this case, as the contents of the message 2, message data of "Do you want to perform normal cleaning or strong cleaning?" is generated. It is determined in S709 whether all the setting values have been set by accepting input (utterance) of the user to the message and making a necessary selection. This determination processing may be performed based on the operation-setting table shown in FIG. 8. Note that in FIG. 7, processing in S704 to S709 is loop processing, and thus only processing of the first cycle has been described above.

If all the setting values have been set, operation instruction data is generated based on information of "operation" (for example, "maintenance"), "function of MFP 400" (for example, "cleaning"), and "additional setting value" (for example, "strong") (S710), all of which have been acquired by the above series of interactions. Then, the voice control device management service 200 transmits the generated operation instruction data to the printing apparatus management service 300 (S711). The printing apparatus management service 300 gives an operation instruction to the MFP 400 based on the received operation instruction data (S712), and then the MFP 400 operates in accordance with the instruction (S713). In the above-described example, for example, the MFP 400 performs head cleaning with the designated strength. The MFP 400 as an operation instruction target is an MFP that is associated with the user account of the user of the voice control device 100 by the procedure shown in FIG. 5. That is, even if the plurality of MFPs 400 are managed by the printing apparatus management service 300, the user can give an operation instruction to the MFP used by himself/herself.

As described above, according to this embodiment, if there is the additional setting item, a voice for requesting the additional setting item of the user is generated and output, and the user subsequently utters a desired item. With this arrangement, even if the setting items for instructing the MFP 400 have a hierarchical structure, the user need not operate the setting screen, and can thus improve the usability.

In addition, even in an environment in which there exist exists a plurality of MFPs, it is possible to operate an MFP associated with the user by voice without influencing the remaining MFPs.

In the above description, if the user utters "Strong", the process advances up to execution of the operation in S713. However, after S709, the voice control device management service 200 may generate confirmation message data of "Are you sure you want to perform strong cleaning?", and transmit it to the voice control device 100. This message may be generated based on the operation stored for each user input and the setting values associated with the operation. In this case, the confirmation message is output from the loudspeaker 101 of the voice control device 100. Then, if the user utters "Yes", the voice control device 100 outputs a message of "Strong cleaning is started" from the loudspeaker 101. The voice control device 100 transmits utterance contents of "Yes" to the voice control device management service 200, similar to S708. After that, processes in S710 to S717 are performed. In the above-described example, if the user utters "No", the processes from S704 may be repeated. By outputting the confirmation message by voice to prompt the user to make a confirmation, the user can reconfirm the instructed operation and then execute the operation.

As described above, in this embodiment, it is possible to issue, via the voice control device 100, an instruction of maintenance such as cleaning in addition to printing. The printing apparatus management service 300 may hold the execution history of the operation of the item 801 of FIG. 8 in, for example, the storage device 210. In this case, response information (S714), that is, a response to the voice control device management service 200 may include the execution history of the operation. For example, this makes it possible to recommend strong cleaning to the user who has repeatedly executed normal cleaning in a short time. The priority level of each setting value may be decided based on the previous operation. Alternatively, a default setting value may be decided.

The information of the table shown in FIG. 8 may be configured to be changeable by the user of the printing apparatus management service 300 (that is, the user is also the user of the voice control device 100). For example, the user may be able to change (edit) contents of each of the items 801, 802, 803, and 804 of the table shown in FIG. 8 on a UI screen displayed on the display unit 204.

Second Embodiment

Figure 6:
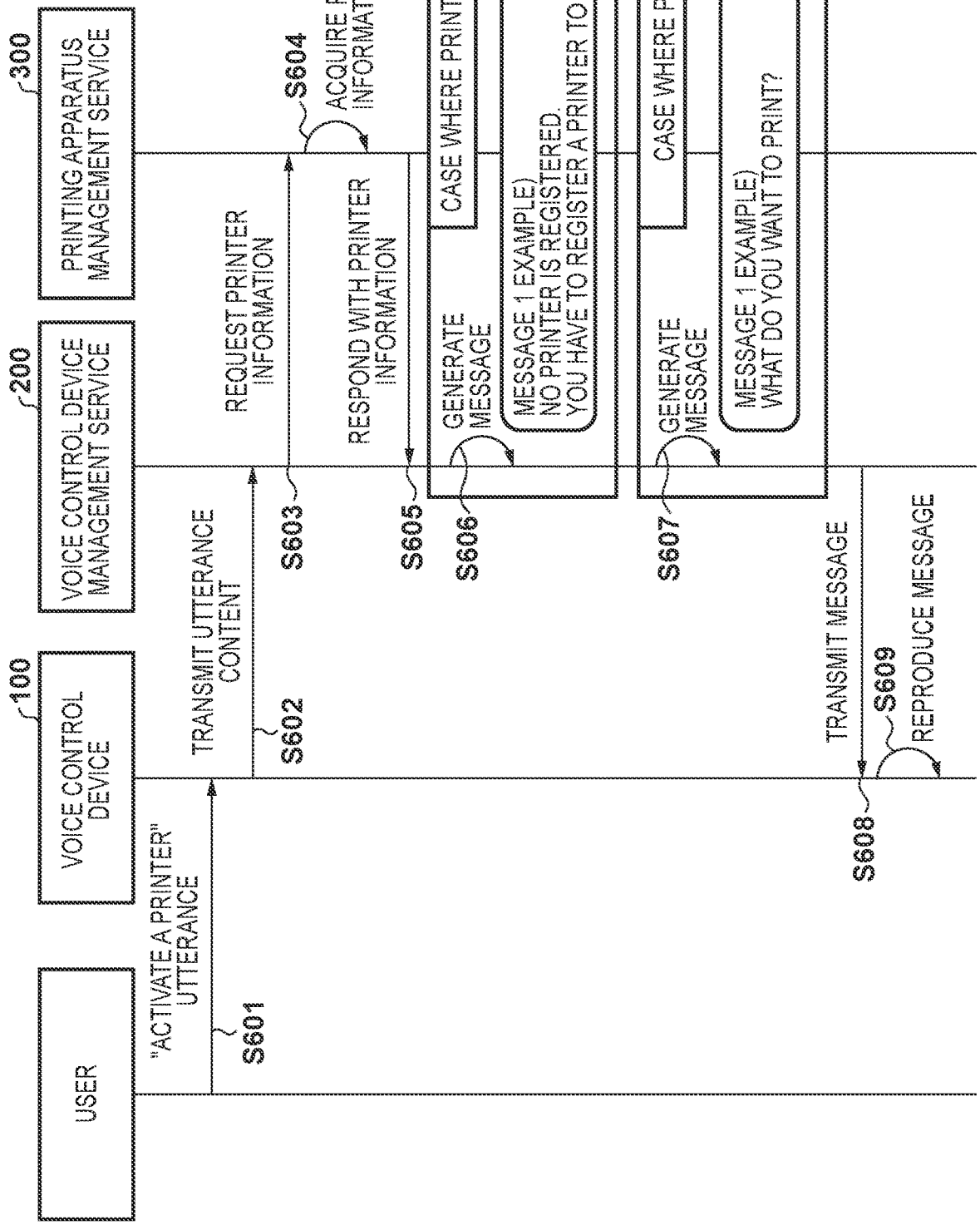
FIG. 6 is a sequence chart showing processing of activating the printing apparatus control system.
Figure 7:
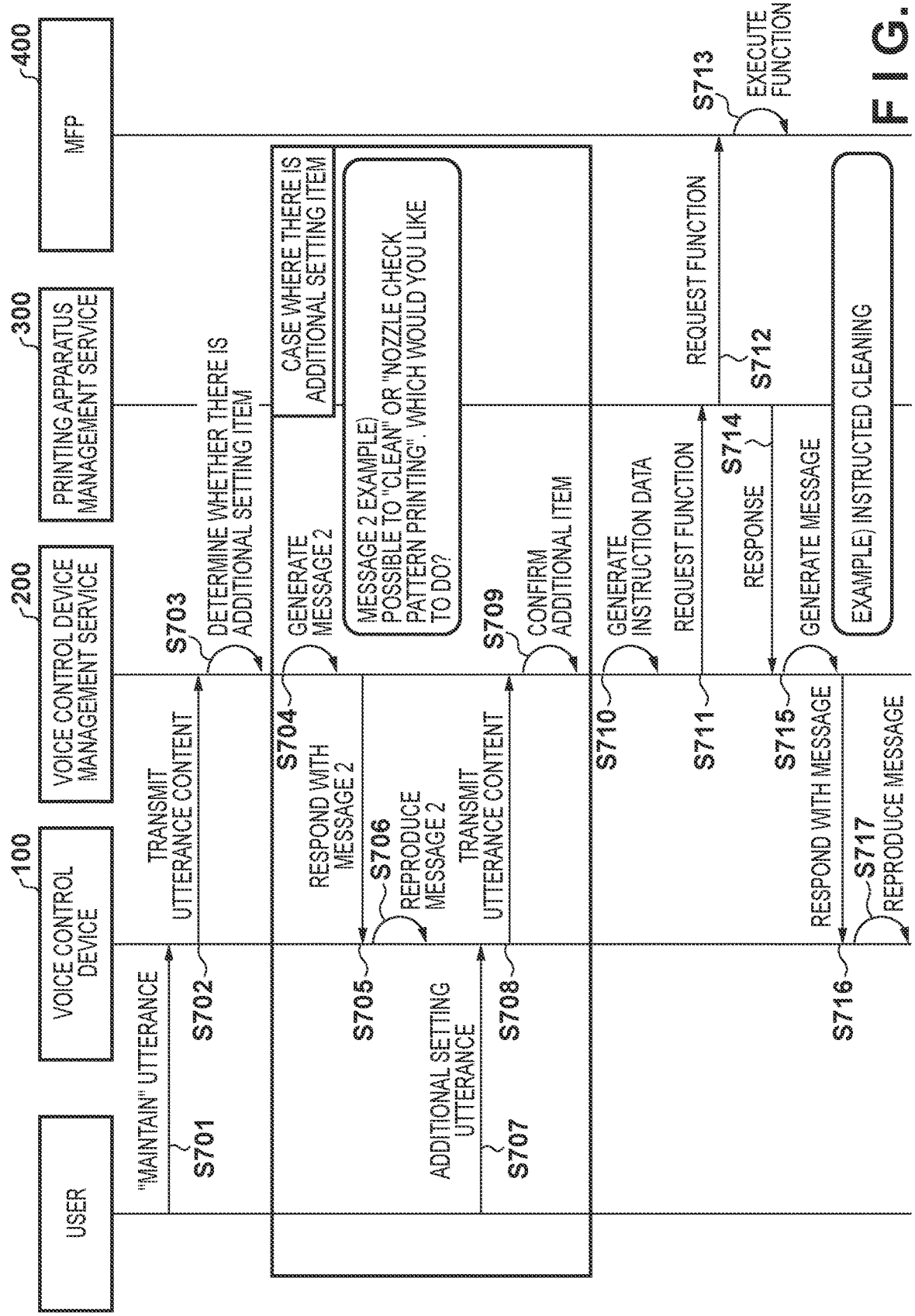
FIG. 7 is a sequence chart showing processing from a user instruction to execution of head cleaning.

In FIG. 6, during the period from when the user issues an operation instruction until the message 1 is generated, the voice control device management service 200 inquires the printing apparatus management service 300 about printer information, and generates the message 1 in accordance with the presence/absence of the printer. However, the operation that can be instructed from a printing apparatus management service 300 may be different between an MFP 400 of an old model and that of a new model. In this case, when a message is generated in accordance with the model used by the user and announced to the user, it is possible to improve the usability. A procedure of generating a message based on specification information of the MFP 400 will be described with reference to FIG. 9.

The user utters "Activate a printer" to a microphone 104 of a voice control device 100 in order to call the function of the MFP 400 (S901). Utterance contents are registered in advance in a voice control device management service 200 as a keyword (activation phrase) to call the function of the MFP 400.

Figure 10:
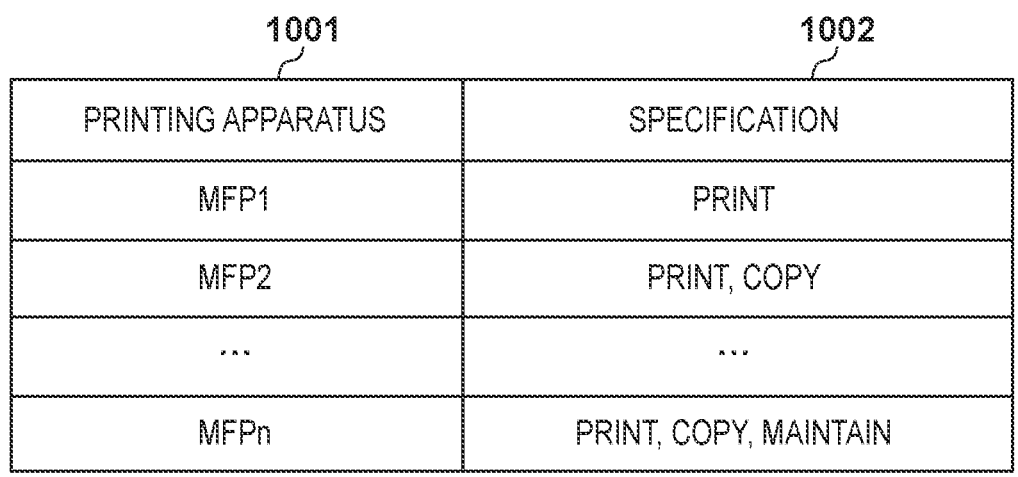
FIG. 10 is a table showing the correspondence between the printing apparatus and specification information.

The voice control device 100 transmits the utterance contents received in S901 to the voice control device management service 200 (S902). Note that voice data of the utterance contents of the user may be transmitted intact, or the voice data may be converted into text data in the voice control device 100 and then transmitted. Then, the voice control device management service 200 inquires the printing apparatus management service 300 about the specification information of the MFP 400 in order to generate utterance contents to the user based on the received keyword of "Activate a printer" (S903). At this time, similar to the first embodiment, the voice control device management service 200 logs in to the printing apparatus management service 300 using an access token linked with a user account which has been used by the voice control device 100 to log in to the voice control device management service 200, thereby making an inquiry. Upon receiving the inquiry, the printing apparatus management service 300 holds a specification table shown in FIG. 10 in, for example, a storage device 210, and acquires specification information corresponding to the MFP 400 under the management of itself (S904), and responds to the voice control device management service 200 (S905). FIG. 10 shows a printing apparatus 1001 and specifications 1002 corresponding to the printing apparatus, and indicates that, for example, only a printing function can be instructed to MFP1 from the printing apparatus management service 300. Note that the table shown in FIG. 10 may be arranged outside the printing apparatus management service 300, for example, in an external cloud service or database. If, for example, the MFP 400 is of the model that can accept only the printing function, a message of "Do you want to execute printing?" is generated (S906). On the other hand, if the MFP 400 is of the model that can accept the printing function and a maintenance function, a message of "Do you want to execute printing or maintenance?" is generated (S907). It is possible to make the user select a function to be used from the functions of a device such as a printing apparatus. The voice control device management service 200 transmits the generated message 1 to the voice control device 100 (S908), and the voice control device 100 reproduces the received message 1 to the user by outputting the message 1 by voice from the loudspeaker 101 (S909).

In this embodiment, the specification information of the MFP 400 is held in the printing apparatus management service 300. However, the MFP 400 may be inquired about the specification information when a request is received from the voice control device management service 200. In this case, the specification information of the MFP 400 about which an inquiry has been made once may be cached, and when the voice control device management service 200 inquires about the specification information next time, a response may be returned based on the cache information.

As another example of changing the operation of a system based on the specification information of the MFP 400, printing of a help page is considered. The help page is a simple instruction manual in which functions that can be instructed by the user by voice in the system can be listed, and can be printed through the system. The user may need a guidance indicating functions in the system during interaction by voice. In this case, when the user utters a keyword such as "Help" for requesting a guidance, an announcement according to the current interaction state may be output by voice.

If the user utters "Help" to a voice output of "What do you want to print?", message data that provides a more detailed description like "You can print, copy, or perform maintenance. You can confirm details by printing the help page. Do you want to print the help page?" may be generated by the voice control device management service 200, and output by voice by the voice control device 100. If the user utters "Yes" in response to this message, the voice control device management service 200 acquires the specification information of the MFP 400 via the printing apparatus management service 300, similar to the procedure shown in FIG. 9. If, for example, the MFP 400 is of the model that supports only the printing function, the voice control device management service 200 generates, based on the acquired specification information of the MFP 400, a help page including only the function commonly used by any models. On the other hand, if the MFP 400 is of the model that also supports the copy and maintenance functions, the voice control device management service 200 generates a help page including the functions used only by the new model in addition to the function commonly used by any models. A print request of print data of the help page generated by the voice control device management service 200 is sent to the printing apparatus management service 300. Upon receiving the print request, the printing apparatus management service 300 transmits a print request to the MFP 400, and the MFP 400 prints the print data.

As described above, a voice guidance of the system may be switched in accordance with the specification information of the MFP 400 held by the user, and print contents may be switched in accordance with the specification information of the MFP 400.

When this system is used, the MFP 400 needs to be in an online state. While the MFP 400 is in an offline state, even if the user instructs an operation by voice to issue an operation instruction from the printing apparatus management service 300 to the MFP 400, the MFP 400 does not operate. To cope with this, the MFP 400 is always maintained in a sleep state, and enables a setting (to be referred to as an automatic power-on setting) of automatically turning on the power in accordance with reception of an operation instruction to perform a predetermined operation, thereby allowing the user to smoothly instruct an operation thereafter. To enable the automatic power-on setting, the power of the MFP 400 needs to be ON. Therefore, a timing at which the printing apparatus management service 300 issues an instruction to enable the automatic power-on setting to the MFP 400 is important. For example, since the power of the MFP 400 is always ON at the time of printing, an operation instruction to enable the automatic power-on setting after the user activates the system for the first time and issues a print instruction for the first time is issued, thereby enabling the automatic power-on setting, and allowing the user to smoothly execute an operation instructed by voice in the MFP 400 from the next time.

According to this embodiment, in the above arrangement, in accordance with the function of a device such as a printing apparatus associated with the user, the user can designate, by voice, a function to be executed. In addition, even if the function of the device associated with the user is changed, for example, extended, the user can flexibly cope with it.

Note that both the techniques of the first and second embodiments can be implemented at the same time, and thus a system including both the techniques of the first and second embodiments may be provided. In each of the embodiments, an apparatus having a function other than the printing function may be set as a management target. In this case, the function other than the printing function is a target of an operation instruction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-124755, filed Jul. 3, 2019 which is hereby incorporated by reference herein in its entirety.

What is claimed is:

1. A system comprising a server system and a printing apparatus capable of communicating with the server system,
the server system including at least one processor and at least one memory storing instructions that, when executed by the at least one processor, cause the server system to:
obtain instruction information based on voice data transmitted by a voice control device that receives an instruction by voice, and
transmit an operation request based on the obtained instruction information to the printing apparatus,
wherein, in a case where the instruction information corresponding to a print instruction is obtained, an operation request to perform printing is transmitted to the printing apparatus,
wherein, in a case where the instruction information corresponding to a maintenance instruction from which maintenance processing to be performed by the printing apparatus cannot be specified is obtained, a name of a first maintenance processing and a name of a second maintenance processing are output by voice and an inquiry as to whether or not to execute one of the first maintenance processing and the second maintenance processing is output by voice,
wherein, in a case where the instruction information corresponding to an instruction to perform the first maintenance processing is obtained and the first maintenance processing is cleaning of a nozzle for recovering an ink discharge capability,
an inquiry as to whether a user wants to perform normal cleaning or strong cleaning is output by voice,
upon receiving a response to the inquiry including a selection of the normal cleaning or the strong cleaning as the instruction information, a confirmation message corresponding to the selection is output by voice, and
upon receiving a positive response to the confirmation message by voice, the operation request to perform the normal cleaning is transmitted to the printing apparatus in a case where the instruction information corresponding to the normal cleaning has been obtained, and the operation request to perform the strong cleaning is transmitted to the printing apparatus in a case where the instruction information corresponding to the strong cleaning has been obtained, and,
the printing apparatus including at least one processor and at least one memory storing instructions that, when executed by the at least one processor, cause the printing apparatus to:
receive the operation request; and
execute operation based on the operation request,
wherein the printing apparatus performs the normal cleaning in a case where the printing apparatus receives the operation request requesting the normal cleaning, and the printing apparatus performs the strong cleaning in a case where the printing apparatus receives the operation request requesting the strong cleaning,
wherein the server system transmits an instruction to enable an automatic power-on setting to the printing apparatus after the operation request to perform printing is transmitted to the printing apparatus for the first time, wherein the automatic power-on setting is a setting for maintaining a sleep state and automatically turning on the power in accordance with reception of an operation request.

2. The system according to claim 1,
wherein the executed instructions further cause the server system to:
output message data to inquire about details of a content of a first type in a case where the instruction information corresponding to the print instruction to print the content of the first type has been obtained, and not inquire about details of a content of a second type that is different from the first type in a case where the instruction information corresponding to the print instruction to print the content of the second type has been obtained.

3. The system according to claim 1,
wherein the server system can receive a copy instruction as the instruction information in addition to the print instruction and the maintenance instruction.

4. The system according to claim 1,
wherein information about a specification of the printing apparatus is obtained as the information related to the printing apparatus.

5. The system according to claim 4,
wherein a maintenance request is transmitted as the operation request only to the printing apparatus having the function that is able to accept the maintenance request from the server system based on the information about the specification of the printing apparatus.

6. The system according to claim 1,
wherein the information related to the printing apparatus is obtained in a case where the instruction information corresponding to an activation instruction of the printing apparatus has been obtained.

7. The system according to claim 1,
wherein the printing apparatus and the voice control device are linked with each other based on a management account to which the voice control device is associated and a service account to which the printing apparatus is associated.

8. The system according to claim 1, wherein
the server system obtains instruction information to the inquiry and transmits the operation request based on the instruction information to the printing apparatus, and wherein
the printing apparatus performs an operation according to the operation request.

9. The system according to claim 1, wherein
the first maintenance processing and the second maintenance processing includes cleaning and nozzle check pattern printing.

10. The system according to claim 1, wherein,
in a case where the instruction information corresponding to a print instruction is obtained, it is determined whether an additional setting is required to generate the operation request, and if the additional setting is required, a first message for requesting the additional setting is output by voice, and if the additional setting is not required, the operation request is generated based on the instruction information and an additional setting already input, and the operation request is transmitted to the printing apparatus.

11. The system according to claim 10, wherein,
in a case where the instruction information corresponding to a request for guidance instead of the additional setting is obtained in response to the first message for requesting the additional setting, a second message including a detailed description regarding the additional setting according to a current interaction state and asking whether or not to print a help page is output by voice.

12. The system according to claim 1, wherein
in a case where an instruction information for printing the help page is obtained in response to the second message asking whether or not to print a help page, an operation request for printing the help page corresponding to functions supported by the printing apparatus is generated and transmitted to the printing apparatus.

* * * * *